Oct. 26, 1954
P. J. KANIUT ET AL
2,692,586
FUEL INJECTOR
Filed Sept. 13, 1949
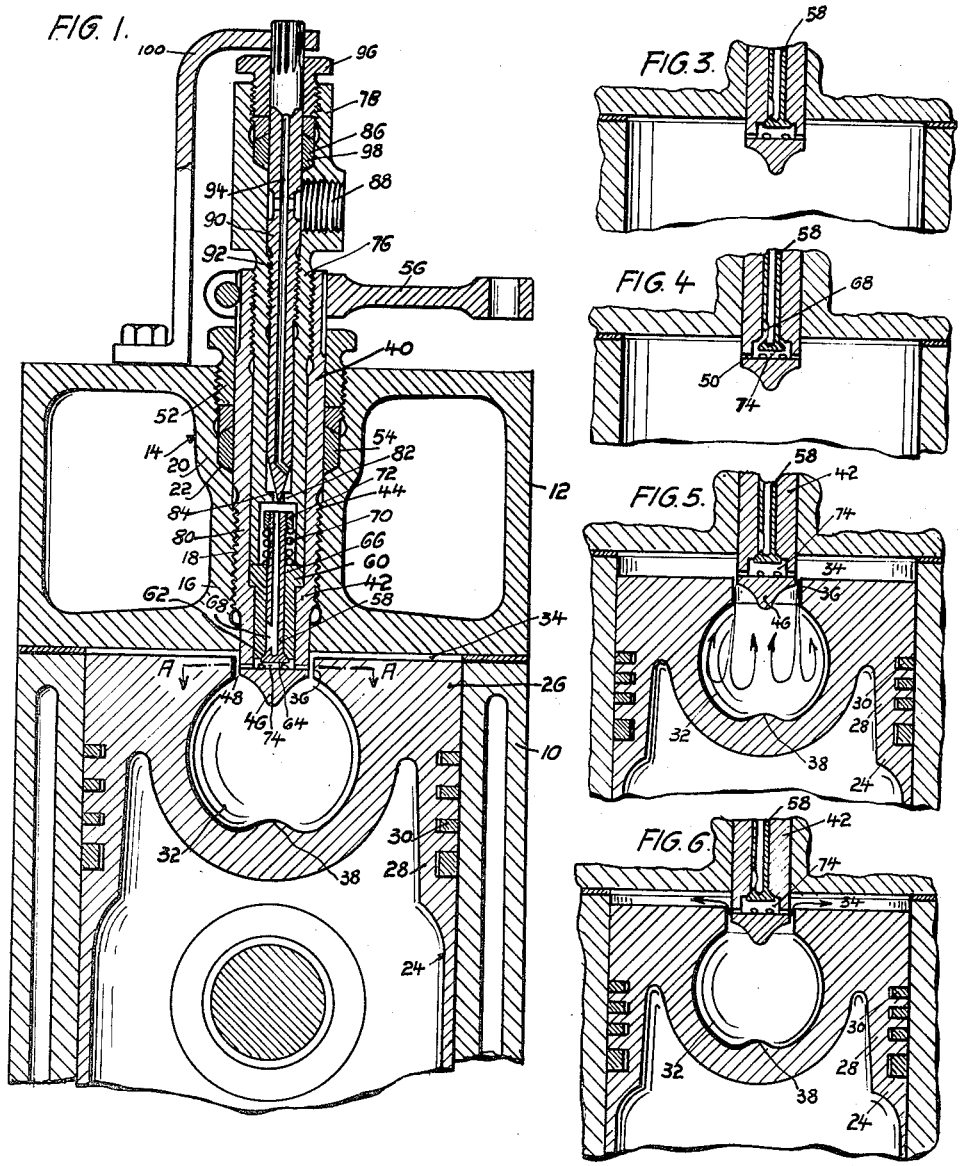
FIG. 2.
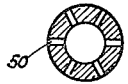
SECTIONAL VIEW A-A
INVENTORS
Paul J. Kaniut
BY Julius E. Witzky
O. H. Fowler
Atty.

Patented Oct. 26, 1954

2,692,586

UNITED STATES PATENT OFFICE 2,692,586

FUEL INJECTOR

Paul J. Kaniut and Julius E. Witzky, Royal Oak, Mich.

Application September 13, 1949, Serial No. 115,438

6 Claims. (Cl. 123—32)

This invention relates to fuel injection for internal combustion engines.

An object of the invention is to provide a fuel injection system for the internal combustion engine wherein the air velocity created during the compression stroke of a piston is utilized for the injection of fuel into the combustion chamber of the engine.

Another object of the invention is to utilize a pressure rise due to a pre-combustion in an auxiliary chamber to create a gas velocity for the injection of fuel into a main combustion chamber.

Another object of the invention is to provide a piston having a pre-combustion chamber in the head thereof, effective to afford an even distribution of injected fuel.

A further object of the invention is to provide a fuel injector for an internal combustion engine having means for effectively timing injections.

Yet a further object of the invention is the provision of means by which the amount of fuel and the injection timing may be simultaneously effected.

Other objects and advantages of the invention will appear from the following description when taken in connection with the accompanying drawings forming a part of this specification and in which:

Fig. 1 is a vertical sectional view of a fuel-injection device and the associated parts of an internal combustion engine.

Fig. 2 is a sectional view of the injector taken substantially on line A—A, Fig. 1.

Fig. 3 is a schematic diagram of an internal combustion engine after combustion.

Fig. 4 is a schematic diagram of an internal combustion engine after intake stroke.

Fig. 5 is a schematic diagram of the compression stroke of an internal combustion engine starting injection of fuel into chamber.

Fig. 6 is a schematic diagram of the expansion stroke of an internal combustion engine with injection of fuel in the main combustion space.

Referring to the drawings for more specific details of the invention, 10 designates a cylinder of an internal combustion engine, and 12 a head therefor having an axially disposed sleeve 14 extended therethrough. The sleeve 14 has a section 16 of reduced diameter at its inner end, an intermediate threaded section 18, and a section 20 of enlarged diameter providing a packing box 22 at the outer end of the sleeve.

A piston 24 reciprocal in the cylinder has a head 26, and a skirt 28 carrying conventional piston rings 30, and the head has therein a centrally disposed pre-combustion chamber 32 communicating with a main combustion chamber 34 forward of the head of the piston, as by a circular orifice and/or throat 36 axially disposed with relation to the piston.

The pre-combustion chamber 32 is preferably globular in general contour and has on its inner wall a conoidal surface 38 arranged in oppositely disposed relation to the orifice or throat 36, and the base of the conoidal surface is flared to blend with the curvature of the inner wall of the chamber so as to enhance the turbulence of air introduced into the chamber under pressure.

A fuel injector 40 is mounted for travel in the sleeve 14 in the head 12 of the cylinder. As shown, the injector includes a barrel 42 having an externally threaded portion 44 received by the threaded section 18 of the sleeve.

The barrel has a conoidal head and/or nozzle 46 extended into the cylinder and adapted to be received by the orifice or throat 36 in the head of the piston with suitable clearance as indicated at 48, and a plurality of equi-spaced radial inlet ports 50 are arranged in the wall of the barrel adjacent the conoidal head 46. The barrel is extended upwardly through the sleeve 14 and a packing nut or plug 52 sleeved on the barrel is received by the packing box 22 so as to effectively compress and retain suitable packing 54 in the box, and a lever 56 is keyed or otherwise fixedly secured to the barrel, the object of which will hereinafter appear.

A valve 58 is fitted in the barrel 42 for control of the flow of fuel. As shown, a cage 60 for the valve is fitted in the reduced portion 16 of the barrel, and the cage has therein a valve seat 62 for the reception of a valve head 64 integral with a hollow stem 66 extended beyond the cage. The hollow stem has therein a port 68 adjacent the head, and a spring 70 sleeved on the stem between the cage and a retaining nut 72 threaded on the stem serves to urge the valve to its closed position, and immediately beneath the valve 58 is a fuel charge chamber 74 in direct communication with the inlet ports 50.

A sleeve 76 having an enlarged head 78 is mounted for travel in the barrel as by threads 80. The sleeve has therein a partition 82 provided with an orifice providing a valve seat 84 and the enlarged head 78 has therein a packing box 86 and a fuel supply port 88 adapted to be connected to a source of fuel under pressure, not shown. However, the pressure is not sufficient to effect the valve 58.

A needle valve 90 is mounted for travel in the sleeve 76 as by threads 92. The needle valve cooperates with the orifice and/or valve seat 84 in the diaphragm 82 to regulate the flow of fuel, and a fuel passage 94 therethrough has direct communication with the supply port 88. The head of the needle valve is extended upwardly through the packing box 86 and a plug 96 sleeved on the needle valve and threaded in the packing box serves to compress and retain packing material 98 in the box, and a bracket 100 fixedly secured to the head 12 receives and serves to retain the needle valve against rotation.

By shifting the lever 56 of the injector, the barrel 42 may be raised or lowered to regulate the timing of injection and concomitantly therewith the relationship of the needle valve 90 to the orifice or valve seat 84 is varied to regulate the flow of fuel.

In a normal operation upon combustion the main and pre-combustion chambers are emptied and the valve 58 is closed, as shown in Fig. 3, and immediately thereafter the piston 28 moves on its retractile or scavenging stroke resulting in the creation of a vacuum in the main and pre-combustion chambers. This imposes suction causing opening of the valve 58 as shown in Fig. 4, with the consequent admission of a charge of fuel into the chamber 74. However, because of the small cross sectional area of the intake ports 50, and due to capillary attraction fuel is not drawn from the charge chamber 74.

On the compression stroke of the piston 28, as shown in Figs. 5 and 6, the valve 58 is closed to effectively trap fuel in the charge chamber 74, and as the piston proceeds on its compression stroke and the head or nozzle 46 on the barrel 42 of the injector enters the orifice 36 providing communication between the main and pre-combustion chambers, a pressure differential occurs between the pre-combustion chamber 32 and the main combustion chamber 34. This pressure differential creates a high air velocity through the clearance 36 between the head 46 and the wall defining the orifice or throat 36, and this high air velocity draws fuel from the charge chamber 74 through the intake ports 50 into the pre-combustion chamber 32.

Due to injection lag, the piston travels from the moment of injection to top dead center, and as soon as the piston reaches top dead center combustion occurs in the pre-combustion chamber. In Fig. 6 the piston is shown at top dead center and as it starts downwardly due to combustion, the pressure rise in the pre-combustion chamber is higher than in the main combustion chamber and this creates a gas velocity from the pre-combustion chamber into the main combustion chamber of such force that the gas stream again draws fuel from the charge chamber into the main combustion chamber where the fuel is distributed and atomized. The peak of the pressure occurs in the pre-combustion chamber and does not act immediately upon the reciprocating parts. It is because of this particular characteristic that the structure may be relatively light as compared to conventional diesel engines.

While this invention has been described in connection with certain embodiments, the principle involved is susceptible of numerous other applications that will readily occur to persons skilled in the art. The invention is, therefore, to be limited as indicated by the scope of the appended claims.

Having thus described the invention, what we claim as new and desire to secure by Letters Patent is:

1. In an internal combustion engine, a cylinder, a piston movable therein, a precombustion chamber in the piston having a throat communicating with the cylinder, a head on the cylinder, an injector in the head, a chamber in the injector, a nozzle on the injector communicating with the chamber and extended into the cylinder and receivable by the throat, a valve in the injector for control of the flow to the chamber, a needle valve in the injector for varying the flow of fuel therethrough, and means for advancing or retracting the nozzle to change the timing of injection and simultaneously varying the flow of fuel.

2. In an internal combustion engine, a cylinder, a head therefor, a fuel injector including a barrel mounted for travel in the head, a chamber in the barrel, a nozzle on the barrel, a conic nose on the nozzle, the nozzle having radial ports communicating with the chamber and with the cylinder, a valve in the barrel controlling flow of fuel to the chamber, a partition in the barrel, a valve seat in the partition, a needle valve cooperating with the valve seat for control of flow of fuel, means for holding the needle against rotation and means for advancing and retracting the nozzle and simultaneously changing the relation of the needle to the valve seat.

3. In an internal combustion engine, a cylinder, a head therefor, a barrel movable in the head, a chamber in the barrel, a nozzle on the barrel having radial ports communicating with the chamber, a conic nose on the nozzle forward of the ports, a valve in the barrel for control of the flow of fuel to the chamber, a needle valve in the barrel for regulating the flow of fuel, means for changing the relation of the barrel to the head and simultaneously adjusting the needle valve.

4. In an internal combustion engine, a cylinder, an injector therefor extended into the cylinder, a conic nose on the injector, means for moving the injector to effectively time injections and vary fuel flow, a piston reciprocable in the cylinder, a pre-combustion chamber in the piston having a throat communicating with the cylinder and adapted to receive the injector with small clearance as the piston nears the end of a compression stroke and a lobe on the inner wall of the chamber in oppositely disposed relation to the nose of the injector.

5. In an internal combustion engine, a cylinder, a head therefor, an injector movable in the head and normally protruded into the cylinder, a conic nose on the injector, means for moving the injector to effectively time injections and simultaneously vary the flow of fuel, a piston reciprocable in the cylinder, a pre-combustion chamber in the head of the piston having a throat providing communication between the pre-combustion chamber and the main combustion chamber and adapted to receive the injector as the piston nears the end of its compression stroke and a lobe on the inner wall of the pre-combustion chamber opposite the conic nose on the injector.

6. In an internal combustion engine, a cylinder, a fuel injector therefor, a chamber in the injector, a nozzle for the injector communicating with the chamber, a conic nose on the nozzle, a valve and a needle valve for control of the flow of fuel to the chamber, means for setting the needle valve, means for moving the injector so as to time injections and simultaneously vary the fuel flow through the needle valve, a piston reciprocable in the cylinder, a pre-combustion chamber in the piston having a throat adapted to receive the nozzle with small clearance as the piston nears the end of its compression stroke and a lobe on the inner wall of the pre-combustion chamber for cooperation with the conic nose on the injector.

References Cited in the file of this patent

UNITED STATES PATENTS

| Number | Name | Date |
|---|---|---|
| 1,663,541 | Braren | June 21, 1927 |
| 2,151,218 | Lutz | Mar. 21, 1939 |
| 2,171,912 | Boxan | Sept. 5, 1939 |
| 2,488,857 | Firing | Nov. 22, 1949 |

FOREIGN PATENTS

| Number | Country | Date |
|---|---|---|
| 230,629 | Great Britain | Mar. 19, 1925 |